(12) United States Patent
Kim (10) Patent No.: US 12,449,782 B2
(45) Date of Patent: Oct. 21, 2025

(54) METHOD FOR REPLACING STORAGE DEVICE IN HUMAN MACHINE INTERFACE SYSTEM

(71) Applicant: LS ELECTRIC CO., LTD., Anyang-si (KR)

(72) Inventor: Kyeong Rae Kim, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 551 days.

(21) Appl. No.: 17/801,383

(22) PCT Filed: Dec. 23, 2020

(86) PCT No.: PCT/KR2020/019007
§ 371 (c)(1),
(2) Date: Aug. 22, 2022

(87) PCT Pub. No.: WO2021/167228
PCT Pub. Date: Aug. 26, 2021

(65) Prior Publication Data
US 2023/0100293 A1    Mar. 30, 2023

(30) Foreign Application Priority Data

Feb. 20, 2020  (KR) .................. 10-2020-0020981

(51) Int. Cl.
| G06F 3/048 | (2013.01) |
| G05B 19/05 | (2006.01) |
| H04M 1/72454 | (2021.01) |

(52) U.S. Cl.
CPC ........ *G05B 19/05* (2013.01); *H04M 1/72454* (2021.01); *G05B 2219/23067* (2013.01)

(58) Field of Classification Search
CPC .......... G05B 19/05; G05B 2219/23067; G05B 19/042; G05B 19/408; G05B 23/02;
(Continued)

(56) References Cited

U.S. PATENT DOCUMENTS

| 2004/0260966 A1 | 12/2004 | Kaiya et al. |
| 2007/0245110 A1* | 10/2007 | Shibayama ............. G06F 3/067 |
| | | 711/165 |
| 2009/0132620 A1 | 5/2009 | Arakawa |

FOREIGN PATENT DOCUMENTS

| CN | 1532682 A | 9/2004 |
| CN | 101449248 A | 6/2009 |

(Continued)

OTHER PUBLICATIONS

Notice of Allowance for related Japanese Application No. 2022-547873; action dated Jan. 16, 2024; (3 pages).

(Continued)

*Primary Examiner* — Aleksey Olshannikov
(74) *Attorney, Agent, or Firm* — K&L Gates LLP (57) ABSTRACT

The present disclosure relates to a method for changing a storage apparatus in the human machine interface system. The method includes recording data to a first storage apparatus connected to a human machine interface (HMI) device, receiving a selection signal for a second storage apparatus during the data recording, stopping data recording to the first storage apparatus based on the selection signal and re-performing the data recording to the second storage apparatus, and it may be applied to other exemplary embodiments.

4 Claims, 5 Drawing Sheets

(58) Field of Classification Search
CPC .... H04M 1/72454; G06F 3/06; G06F 3/0604; G06F 3/0629; G06F 3/0653; G06F 3/0683
See application file for complete search history.

(56) References Cited

FOREIGN PATENT DOCUMENTS

| | | |
|---|---|---|
| CN | 106201354 A | 12/2016 |
| JP | 2010278488 A | 12/2010 |
| JP | 2011018204 A | 1/2011 |
| JP | 2016012172 A | 1/2016 |
| JP | 2016066145 A | 4/2016 |
| JP | 2018518734 A | 7/2018 |
| JP | 2019016124 A | 1/2019 |
| JP | 2019169092 A | 10/2019 |
| KR | 1020090059693 A | 6/2009 |
| KR | 1020140134116 A | 11/2014 |
| KR | 1020150032065 A | 3/2015 |

OTHER PUBLICATIONS

Office Action for related Korean Application No. 10-2020-0020981; action dated Aug. 29, 2021; (3 pages(.
Office Action for related Japanese Application No. 2022-547873; action dated Sep. 19, 2023; (5 pages).
International Search Report for related International Application No. PCT/KR2020/019007; report dated Aug. 26, 2021; (5 pages).
Written Opinion for related International Application No. PCT/KR2020/019007; report dated Aug. 26, 2021; (8 pages).
Office Action for related Chinese Application No. 202080096857.1; action dated Apr. 29, 2025; (8 pages).

* cited by examiner

METHOD FOR REPLACING STORAGE DEVICE IN HUMAN MACHINE INTERFACE SYSTEM

CROSS-REFERENCE TO RELATED APPLICATION

The present application is a National Stage of International Application No. PCT/KR2020/019007 filed on Dec. 23, 2020, which claims priority to and the benefit of Korean Utility Model Application No. 10-2020-0020981, filed on Feb. 20, 2020, the disclosure of which is incorporated herein by reference in its entirety.

FIELD

The present disclosure relates to a method for changing a storage apparatus in the human machine interface system.

BACKGROUND

Recently, as various fields of the usage of automation equipment have been diversified and required functions have become complicated, the necessity of a user interface device for effectively controlling and monitoring automation equipment by an operator has increased. Such a user interface device for controlling and monitoring automation equipment is referred to as a human machine interface (HMI).

A general HMI system performs a function of intuitively displaying data of an industrial controller such as a programmable logic controller (PLC), an inverter, a robot or the like to a user and a function of controlling the industrial controller according to a control command input from the user. In particular, the HMI system performs a function of reading data related to an event from the industrial controller and recording the data in a storage apparatus inside the HMI system when a predetermined event occurs in the industrial controller. In this case, the predetermined event may include the arrival of a time desired by the user and a case in which data of the industrial controller satisfies a specific condition, a case in which data of the industrial controller returns to a designated condition after the data of the industrial controller deviates from the designated condition and the like.

However, recently, as the demand for utilization of data recorded in a storage apparatus has increased, cases in which data is stored in an external storage apparatus by connecting at least one external storage apparatus to the HMI system and data stored in the external storage apparatus is utilized have increased. In particular, when an external storage apparatus which stores data is replaced, problems have occurred in that data is broken or the recording of data is omitted during the replacement time of the external storage apparatus.

SUMMARY

The exemplary embodiments of the present disclosure for solving the problems of prior art as described above provide a method for changing a storage apparatus in the human machine interface system that may store data in a second storage apparatus without data corruption and the omission of data recording, even if the data storage location is changed to the second storage apparatus because the second storage apparatus is newly connected while data is being saved to a first storage apparatus pre-connected to the HMI device.

The method for changing a storage apparatus according to an exemplary embodiment of the present disclosure includes, recording data to a first storage apparatus connected to a human machine interface (HMI) device, receiving a selection signal for a second storage apparatus during the recording data, stopping data recording to the first storage apparatus based on the selection signal and re-performing the data recording to the second storage apparatus.

In addition, the receiving the selection signal includes, confirming the connection of the second storage apparatus while recording data to the first storage apparatus, displaying a selection window for a storage apparatus upon confirming the connection of the second storage apparatus and receiving a selection signal for the second storage apparatus in the selection window.

In addition, the method further includes, after the stopping data recording, changing the storage apparatus for the data recording to the second storage apparatus.

In addition, the method further includes, before the recording data to the first storage apparatus, generating data for at least one event as at least one work object.

In addition, the recording data to the first storage apparatus includes receiving the at least one work object and storing in the first storage apparatus.

In addition, the changing the storage apparatus for the data recording to the second storage apparatus includes, completing the storage of a work object for an event being stored in the first storage apparatus, and changing the storage apparatus of the work object for an event generated after the storage in the first storage apparatus is completed to the second storage apparatus.

In addition, the method further includes, after the re-performing the data recording, confirming a time point at which the first storage apparatus can be removed when the storage of the work object in the first storage apparatus is completed and detecting removal of the first storage apparatus.

As described above, the method for changing a storage apparatus in the human machine interface system according to the present disclosure has the effects of resolving data corruption and the omission of data recording, even if the data storage location is changed to a second storage apparatus because the second storage apparatus is newly connected while data is being saved to a first storage apparatus pre-connected to the HMI device.

DETAILED DESCRIPTION

Hereinafter, preferred exemplary embodiments according to the present disclosure will be described in detail with reference to the accompanying drawings. The detailed description set forth below in conjunction with the accompanying drawings is intended to describe exemplary embodiments of the present disclosure and is not intended to represent the only exemplary embodiments in which the present disclosure may be practiced. In order to clearly describe the present disclosure in the drawings, parts irrelevant to the description may be omitted, and the same reference numerals may be used for the same or similar components throughout the specification.

In an exemplary embodiment of the present disclosure, expressions such as "or" and "at least one" may indicate one of the words listed together, or a combination of two or more. For example, "A or B" and "at least one of A and B" may include only one of A or B, or both A and B.

Figure 1:
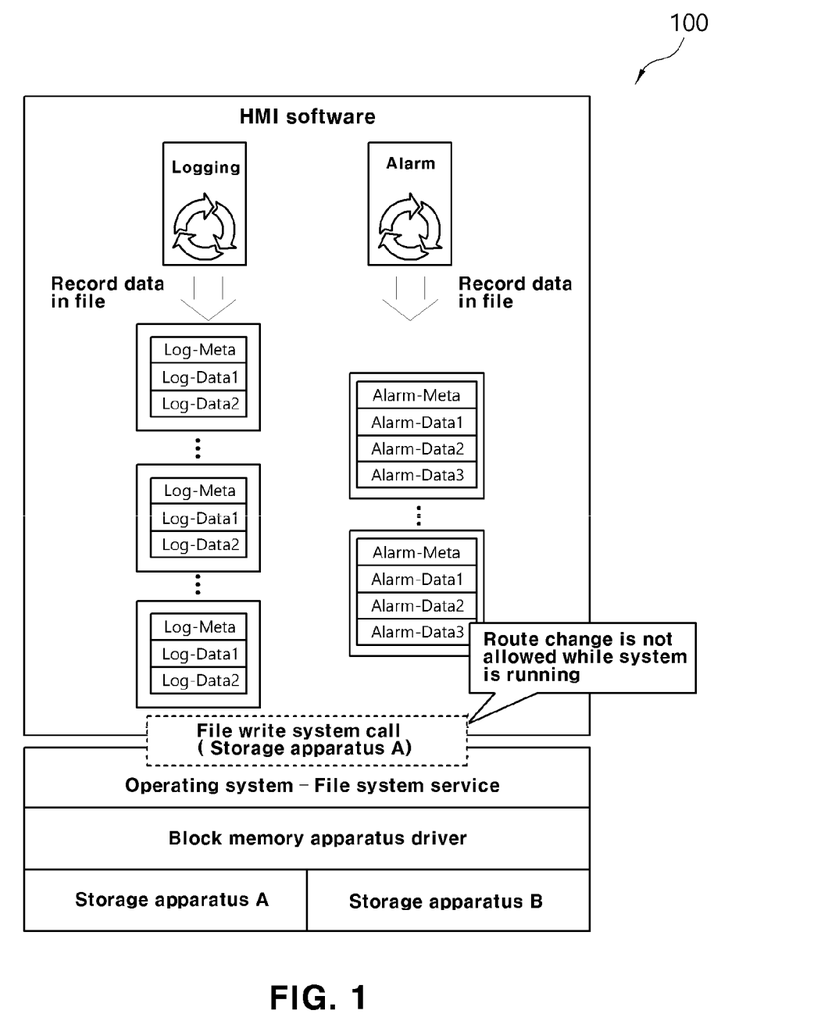
FIG. 1 is a diagram for describing a process of recording data to an external storage apparatus connected to a conventional HMI device.

FIG. 1 is a diagram for describing a process of recording data to an external storage apparatus connected to a conventional HMI device.

Referring to FIG. 1, generally, a human machine interface (HMI) device 100 connected to a programmable logic controller (PLC) system (not illustrated) records data related to a generated event in a corresponding file when a preset event occurs, and saves the corresponding file to storage apparatus A. In this case, the preset event may include the arrival of a time desired by the user (e.g., an alarm), a time-based situation record for data (e.g., logging) and the like.

More specifically, the HMI device 100 creates a file in which data related to a corresponding event in which an event is generated is recorded, or calls an already created file to record event-related data in the corresponding file. In this case, the file itself to record data may be stored in the storage apparatus A connected to the HMI device 100. However, in order to create a file and record data to the file, the operating system checks the path of the file and the data to be recorded to the file through a file write system call, and controls the storage apparatus A through a block memory device driver and stores the file in which the data is recorded in the storage apparatus A. In this case, the operating system may be HMI software. In addition, the HMI device 100 may record data related to a first event in a first file, and record data related to a second event in a second file to store the data in the storage apparatus A.

As such, the storage apparatus A for storing a file in which the data is recorded is generally determined before the HMI device 100 is driven. In addition, if there is no free space in the storage apparatus A or if it is intended to check the data stored in the storage apparatus A, when the storage apparatus is replaced from storage apparatus A to storage apparatus B, problems occur in that the file stored in the storage device A is logically or physically damaged during the removal of the storage device A. In order to prevent such file damage, the storage of event-related data is stopped and saved again after replacing with the storage apparatus B, and in this case, problems occur in that data is lost during the replacement from the storage apparatus A to the storage apparatus B.

Figure 2:
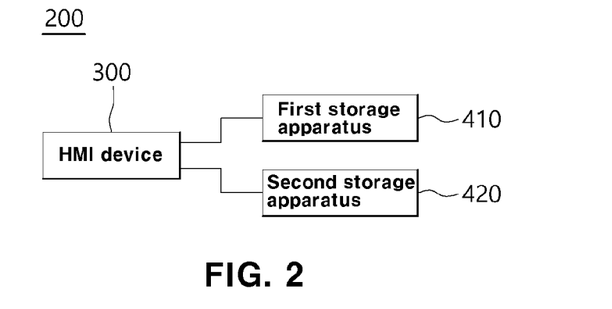
FIG. 2 is a diagram showing the storage apparatus replacement system according to an exemplary embodiment of the present disclosure.

FIG. 2 is a diagram showing the storage apparatus replacement system according to an exemplary embodiment of the present disclosure.

Referring to FIG. 2, the replacement system 200 according to the present disclosure includes an HMI device 300, a first storage apparatus 410 and a second storage apparatus 420.

Figure 3:
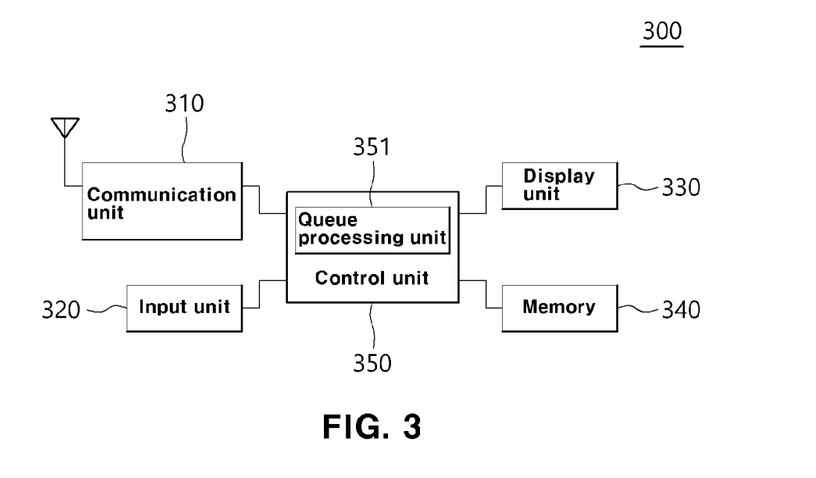
FIG. 3 is a diagram illustrating the HMI device according to an exemplary embodiment of the present disclosure.

The HMI device 300 intuitively displays data of devices included in the PLC system (not illustrated) to the user, and performs a function of controlling the corresponding device according to a control command input from the user. In addition, the HMI device 300 stores data about an event generated in the PLC system in the first storage apparatus 410, and when a signal for replacing the storage apparatus is received, the data is stored in the second storage apparatus 420. The HMI device 300 according to an exemplary embodiment of the present disclosure will be described in more detail with reference to FIG. 3 below. FIG. 3 is a diagram illustrating the HMI device according to an exemplary embodiment of the present disclosure.

Referring to FIG. 3, the HMI device 300 according to the present disclosure includes a communication unit 310, an input unit 320, a display unit 330, a memory 340, a first storage apparatus 410, and a second storage apparatus 420 and a control unit 350.

The communication unit 310 performs communication with a CPU module (not illustrated) included in the PLC system (not illustrated). To this end, the communication unit 310 may perform serial communication such as RS-232, RS-485 or the like. Moreover, the communication unit 310 may perform communication using various Ethernet methods as well as serial communication. In addition, the communication unit 310 performs communication with the first storage apparatus 410 and the second storage apparatus 420 connected to the HMI device 300. To this end, the communication unit 310 may perform universal serial bus (USB) communication.

The input unit 320 generates input data in response to a user input of the HMI device 300. The input unit 320 includes at least one input means. To this end, the input unit 320 may include a keyboard, a mouse, a keypad, a dome switch, a touch panel, a touch key, a button and the like.

The display unit 330 outputs output data according to the operation of the HMI device 300. More specifically, the display unit 330 displays a selection window for a storage apparatus connected to the HMI device 300. To this end, the display unit 330 may include a liquid crystal display (LCD), a light emitting diode (LED) display, an organic light emitting diode (OLED) display, a micro-electro mechanical systems (MEMS) display and an electronic paper display. The display unit 330 may be combined with the input unit 320 to be implemented as a touch screen.

The memory 340 stores operation programs of the HMI device 300. In particular, the memory 340 stores HMI software for the operation of the HMI device 300.

The control unit 350 records data related to the event generated in the first storage apparatus 410 preset to store data when a preset event occurs in the PLC system. In this case, the event may include the arrival of a time desired by the user (e.g., an alarm), a time-based situation record for data (e.g., logging) and the like. More specifically, the control unit 350 generates a file in which data is recorded as one work object, and provides the created work object to a queue processing unit 351. In this case, the queue processing unit 351 is generated by HMI software stored in the memory 340, and the operation of the control unit 350 described in an exemplary embodiment of the present disclosure may be an operation performed by the HMI software.

The control unit 350 sequentially provides the created work objects to the queue processing unit 351, and the queue processing unit 351 sequentially stores the work objects in the first storage apparatus 410 through a file write system call. When the connection of the second storage apparatus 420 is confirmed while the work object is stored in the first storage apparatus 410, the control unit 350 displays a selection window on the display unit 330. In this case, the selection window may be a selection window for the user to select any one of the first storage apparatus 410 and the second storage apparatus 420. When a selection signal for the second storage apparatus 420 is received through the input unit 320 after displaying the selection window, the control unit 350 stops the storage of the work object in the first storage apparatus 410, and the storage location of the work object is changed from the first storage apparatus 410 to the second storage apparatus 420.

More specifically, the control unit 350 notifies a selection signal received from the input unit 320 to the queue processing unit 351. When the storage of the work object currently being stored in the first storage apparatus 410 is completed, the queue processing unit 351 temporarily stops the storage of the work object according to the selection signal. The queue processing unit 351 performs a file write system call to change the storage apparatus for storing data from the first storage apparatus 410 to the second storage apparatus 420. When the change of the storage apparatus to the second storage apparatus 420 is completed, the queue processing unit 351 stores in the second storage apparatus 420 the work object for an event that occurs after the event related to the work object is stored in the first storage apparatus 410.

When the removal of the first storage apparatus 410 is detected, the control unit 350 may confirm that the removal of the first storage apparatus 410 is complete and display a corresponding message on the display unit 330. In addition, the queue processing unit 351 may confirm that the time point when the storage of the work object stored in the first storage apparatus 410 is completed is a time point at which the first storage apparatus 410 can be removed.

The first storage apparatus 410 is a storage apparatus connected from the outside of the HMI device 300 and may be USB storage. To this end, the first storage apparatus 410 may perform USB cable communication with the communication unit 310. The first storage apparatus 410 stores data about an event generated in the PLC system connected to the HMI device 300. To this end, the first storage apparatus 410 may be set as a basic storage apparatus for data storage.

The second storage apparatus 420 is a storage apparatus connected from the outside of the HMI device 300 and may be USB storage. To this end, the second storage apparatus 420 may perform USB cable communication with the communication unit 310. The second storage apparatus 420 may store data after it is set by the control unit 350 to store data for an event generated in the PLC system. In addition, although it is described as an example that the first storage apparatus 410 and the second storage apparatus 420 are connected to the HMI device 300 in an exemplary embodiment of the present disclosure, the present disclosure is not limited thereto. That is, there may be two or more storage apparatuses connected to the HMI device 300.

Figure 4:
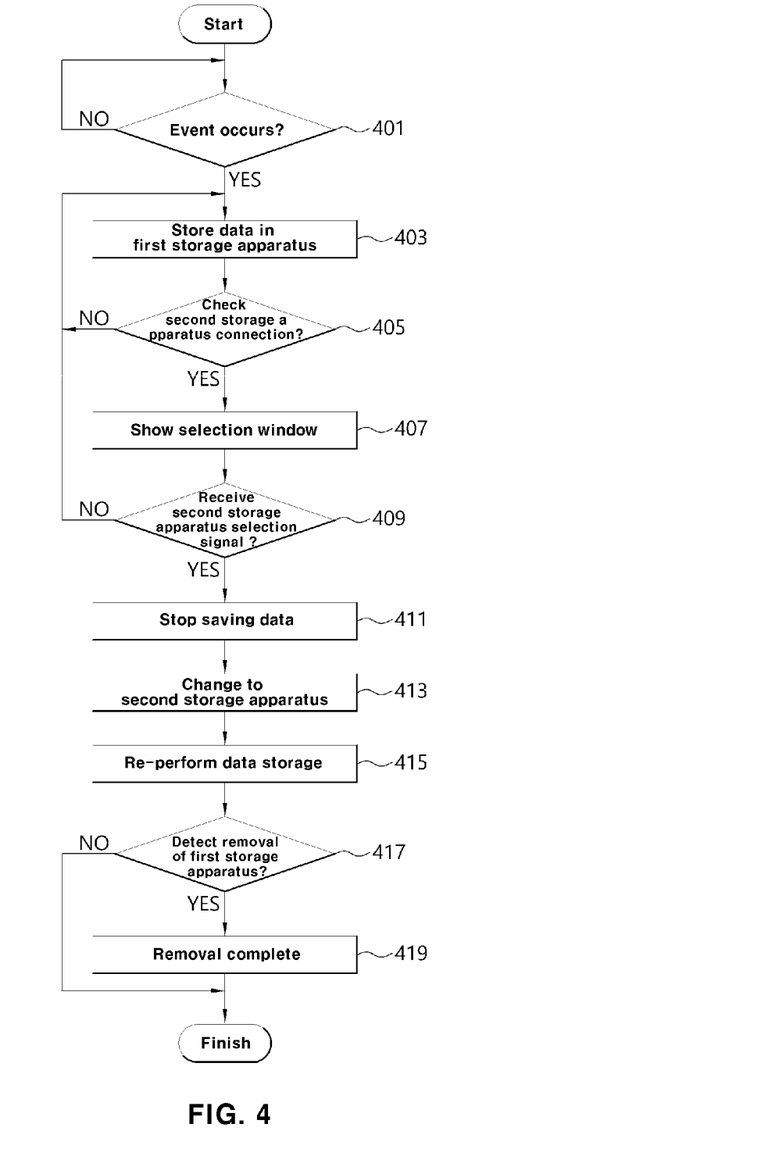
FIG. 4 is a flowchart illustrating the method for changing a storage apparatus in the HMI device according to an exemplary embodiment of the present disclosure.

FIG. 4 is a flowchart illustrating the method for changing a storage apparatus in an HMI device according to an exemplary embodiment of the present disclosure.

Referring to FIG. 4, in step 401, the control unit 350 confirms whether an event has occurred in the PLC system. As a result of the confirmation in step 401, the control unit 350 performs step 403 when an event occurs in the PLC system, and continuously checks whether the event occurs when the event does not occur. In this case, the event may include the arrival of a time desired by the user (e.g., an alarm), a time-based situation record for data (e.g., logging) and the like.

In step 403, the control unit 350 records data related to an event generated in the first storage apparatus 410 preset to store the data. More specifically, the control unit 350 creates a file in which data on the generated event is recorded, or calls an already created file and records the event-related data in the file. To this end, the control unit 350 creates a file in which data is recorded as one work object, and provides the created work object to the queue processing unit 351.

Figure 5:
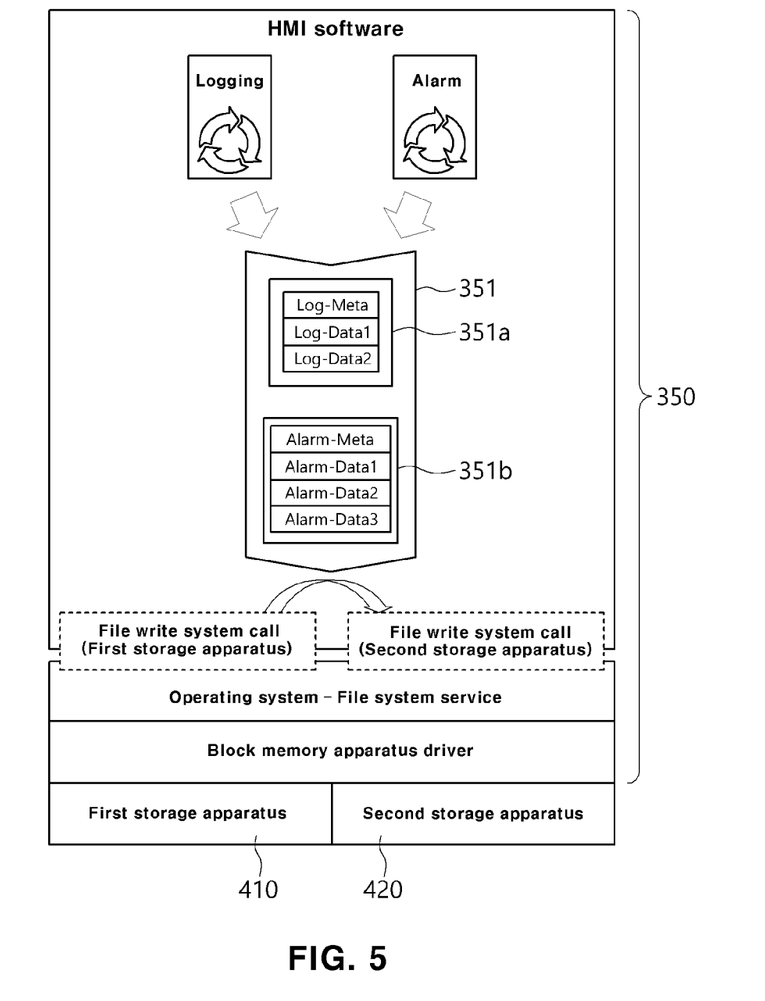
FIG. 5 is a diagram for describing a process of recording data to an external storage apparatus connected to the HMI device according to an exemplary embodiment of the present disclosure.

The control unit 350 sequentially provides the created work objects to the queue processing unit 351. The queue processing unit 351 sequentially calls the work objects to store the work objects in the first storage apparatus 410 through a file write system call. This will be described in detail with reference to FIG. 5 below. FIG. 5 is a diagram for describing a process of recording data to an external storage apparatus connected to the HMI device according to an exemplary embodiment of the present disclosure.

Referring to FIG. 5, when a preset logging event occurs, the control unit 350 of the HMI device 300 to which the PLC system (not illustrated) is connected records data related to the logging event to a file, and generates a file in which data is recorded as a first work object 351a and provides it to the queue processing unit 351. In addition, when a preset alarm event occurs, the control unit 350 records data related to the alarm event in a file, generates a file in which the data is recorded as a second work object 351b and provides it to the queue processing unit 351. The queue processing unit 351 sequentially stores the work objects 351a, 351b in the first storage apparatus 410 through a file write system call.

As in step 403, the storage of the first work object 351a in the first storage apparatus 410 is completed, and while the second work object 351b is being stored, the control unit 350 confirms that the second storage apparatus 420 is connected in step 405. As a result of the confirmation in step 405, if the second storage apparatus 420 is connected, the control unit 350 performs step 407, and if the connection of the second storage apparatus 420 is not confirmed, the control unit 350 may return to step 403 and perform step 403 again.

Figure 6:
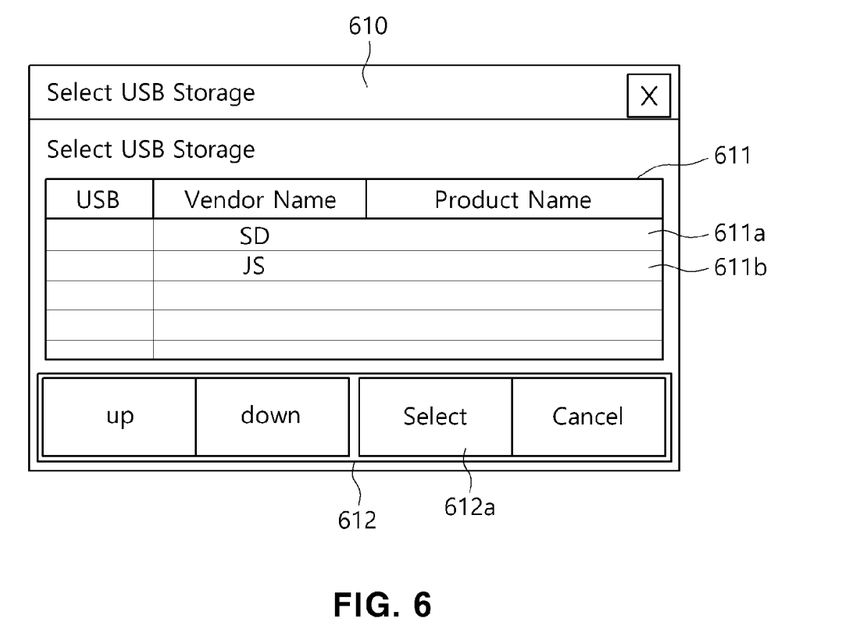
FIG. 6 is an exemplary screen diagram showing a selection window for selecting an external storage apparatus connected to the HMI device during data recording according to an exemplary embodiment of the present disclosure.

In step 407, the control unit 350 displays a selection window on the display unit 330. In this case, the selection window may be a selection window for the user to select any one of the first storage apparatus 410 and the second storage apparatus 420. In step 409, when a selection signal for the second storage apparatus 420 is received through the input unit 320 after displaying the selection window, the control unit 350 performs step 411, and if the selection signal for the second storage apparatus 420 is not received, it returns to step 403. This will be described in detail with reference to FIG. 6 below. FIG. 6 is an exemplary screen diagram showing a selection window for selecting an external storage apparatus connected to the HMI device during data recording according to an exemplary embodiment of the present disclosure.

Referring to FIG. 6, when the connection of the second storage apparatus 420 is confirmed, the control unit 350 displays a selection window 610 on the display unit 330. The selection window 610 includes a list screen 611 for checking a list of storage apparatuses connected to the HMI device 300 and a plurality of buttons 612 for inputting signals. In this case, the list screen 611 includes a first area 611a in which information on the first storage apparatus 410 is displayed and a second area 611b in which information on the second storage apparatus 420 is displayed, and the plurality of buttons 612 may include UP/DOWN buttons for changing the order of the storage apparatuses displayed on the list screen 611 and a select button 612a/cancel button for selecting and canceling the storage apparatus.

When the selection signal for the second area 611b and the selection signal for the select button 612a are received from the input unit 320 while the selection window 610 as shown in FIG. 6 is displayed on the display unit 330, the control unit 350 performs step 411. In step 411, the control unit 350 stops the storage of the work object in the first storage apparatus 410, and in step 413, the control unit 350 changes the storage location of the work object from the first storage apparatus 410 to the second storage apparatus 420. In step 415, the control unit 350 re-performs the storage of the work object in the second storage apparatus 420.

More specifically, the control unit 350 notifies the selection signal received from the input unit 320 to the queue processing unit 351. For example, when a selection signal is received while the queue processing unit 351 is storing the second work object 351b in the first storage apparatus 410, the queue processing unit 351 confirms the completion of storage of the second work object 351b in the first storage apparatus 410. When the storage completion of the second work object 351b is confirmed, the queue processing unit 351 temporarily stops the storage of the work object according to a selection signal received from the control unit 350. Then, the queue processing unit 351 performs a file write system call to change the storage apparatus from the first storage apparatus 410 to the second storage apparatus 420. When the change of the storage apparatus to the second storage apparatus 420 is completed, the queue processing unit 351 stores in the second storage device 420 the work object for an event that occurs after the event related to the second work object 351b.

Subsequently, when the removal of the first storage device 410 is detected in step 417, the control unit 350 may perform step 419, and if the removal of the first storage device 410 is not detected, the control unit 350 may terminate the corresponding process. In step 419, the control unit 350 may confirm that the removal of the first storage device 410 is complete and display a corresponding message on the display unit 330. Moreover, the queue processing unit 351 may confirm that the time point when the storage of the work object stored in the first storage device 410 is completed is a time point at which the first storage device 410 can be removed. For example, the time point when the storage of the work object stored in the first storage device 410 is completed may be a time point at which the storage of the second work object 351b is completed.

As described above, the present disclosure may solve problems such as file damage and data omission that may occur when replacing a storage apparatus.

The exemplary embodiments of the present disclosure disclosed in the present specification and drawings are merely provided for specific examples in order to easily describe the technical contents of the present disclosure and help the understanding of the present disclosure, and are not intended to limit the scope of the present disclosure. Therefore, the scope of the present disclosure should be construed as including all changes or modifications derived based on the technical spirit of the present disclosure in addition to the exemplary embodiments disclosed herein.

The invention claimed is:

1. A method for changing a storage apparatus of a human machine interface (HMI) device, the storage apparatus comprising a first storage apparatus and a second storage apparatus connectable to the HMI device, the method comprising:
   generating a plurality of work objects, each corresponding to data recorded in a respective file, when a plurality of preset events occur;
   providing the plurality of work objects to a queue processing unit;
   requesting, by the queue processing unit, a file system service of an operating system to sequentially store the plurality of work objects in the first storage apparatus;
   receiving a selection signal for the second storage apparatus during the recording data;
   confirming, by the queue processing unit, completion of storage of a first work object from among the plurality of work objects in the first storage apparatus, the first work object being processed for storage when the selection signal has been received;
   stopping data recording to the first storage apparatus corresponding to the selection signal; and
   requesting, by the queue processing unit, the file system service of the operating system to store a second work object from among the plurality of work objects in the second storage apparatus, the second work object being next in sequence to be requested for storage after the first work object.

2. The method of claim 1, wherein receiving the selection signal comprises:
   confirming connection of the second storage apparatus while recording data to the first storage apparatus;
   displaying a selection window for a storage apparatus upon confirming connection of the second storage apparatus; and
   receiving the selection signal for the second storage apparatus in the selection window.

3. The method of claim 2, further comprising, after stopping data recording, changing the storage apparatus for data recording to the second storage apparatus.

4. The method of claim 1, further comprising:
   confirming a time point at which the first storage apparatus can be removed when the storage of the first work object in the first storage apparatus is completed; and
   detecting removal of the first storage apparatus.

\* \* \* \* \*